(12) United States Patent
Na

(10) Patent No.: US 12,444,015 B2
(45) Date of Patent: Oct. 14, 2025

(54) DATA PROCESSING METHOD, COMPUTER DEVICE AND STORAGE MEDIUM

(71) Applicant: SHANGHAI BILIBILI TECHNOLOGY CO., LTD., Shanghai (CN)

(72) Inventor: Zhicheng Na, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 365 days.

(21) Appl. No.: 18/154,681

(22) Filed: Jan. 13, 2023

(65) Prior Publication Data

US 2023/0222622 A1 Jul. 13, 2023

(51) Int. Cl.
*G06T 1/60* (2006.01)
*H04N 21/44* (2011.01)

(52) U.S. Cl.
CPC ............... *G06T 1/60* (2013.01); *H04N 21/44* (2013.01)

(58) Field of Classification Search
None
See application file for complete search history.

(56) References Cited

U.S. PATENT DOCUMENTS

| | | | | |
|---|---|---|---|---|
| 11,100,054 | B2* | 8/2021 | Fang | G06F 21/64 |
| 11,308,263 | B2* | 4/2022 | Lee | G06F 3/0484 |
| 11,334,630 | B2* | 5/2022 | Srinivasan | G06F 16/9035 |
| 11,475,549 | B1* | 10/2022 | Kumar | G06T 5/92 |
| 2012/0306901 | A1* | 12/2012 | Poddar | G06T 1/60 345/545 |
| 2013/0215115 | A1* | 8/2013 | Jenkins | G06T 15/20 345/419 |
| 2015/0154219 | A1* | 6/2015 | Kruglick | G06F 9/5072 707/692 |
| 2016/0148433 | A1* | 5/2016 | Petrovskaya | G02B 27/01 345/633 |
| 2016/0180449 | A1* | 6/2016 | Naware | G06Q 30/0643 703/7 |
| 2019/0243685 | A1* | 8/2019 | Guim Bernat | G06F 1/30 |

(Continued)

FOREIGN PATENT DOCUMENTS

| | | |
|---|---|---|
| CN | 108434742 A | 8/2018 |
| CN | 108597028 A | 9/2018 |
| CN | 109523621 A | 3/2019 |

(Continued)

OTHER PUBLICATIONS

Li et al., "Rendering Optimization for Mobile Web 3D Based on Animation Data Separation and On-Demand Loading" (Year: 2020).*

(Continued)

*Primary Examiner* — Hilina K Demeter
(74) *Attorney, Agent, or Firm* — FisherBroyles, LLP

(57) ABSTRACT

A data processing method and apparatus are provided. The method is applied to a server, and includes: receiving an object loading instruction for a target object; obtaining computing resource information and rendering resource information corresponding to the target object based on the object loading instruction; performing calculation based on the computing resource information to generate rendering data information; and sending the rendering data information and the rendering resource information to a client.

12 Claims, 6 Drawing Sheets

(56) References Cited

U.S. PATENT DOCUMENTS

2021/0056306 A1* 2/2021 Hu ...................... G06V 40/193

FOREIGN PATENT DOCUMENTS

| | | | |
|---|---|---|---|
| CN | 111324250 | A | 6/2020 |
| CN | 111494952 | A | 8/2020 |
| CN | 111773719 | A | 10/2020 |
| CN | 112052097 | A | 12/2020 |
| CN | 112700541 | A | 4/2021 |
| CN | 113255025 | A | 8/2021 |

OTHER PUBLICATIONS

Notice Allowance issued for counterpart CN Appl. No. 202210036794.1 mailed Nov. 15, 2023, 4 pages.
CN Appl. No. 2022100367941, "Office Action", mailing date: May 30, 2023, 11 pages.

\* cited by examiner

DATA PROCESSING METHOD, COMPUTER DEVICE AND STORAGE MEDIUM

CROSS-REFERENCES TO RELATED APPLICATIONS

This application claims priority to Chinese Patent Application No. 202210036794.1, filed on Jan. 13, 2022, the contents of which are hereby incorporated by reference in their entirety for all purposes.

TECHNICAL FIELD

The present application relates to the field of computer technologies, and in particular, to a data processing method. The present application also relates to a data processing apparatus, a data processing system, a computing device, and a computer-readable storage medium.

BACKGROUND

With the rise of the livestreaming industry, forms of livestreaming are gradually diversified. As a new form of livestreaming, enabling a virtual image to act as an online streamer has a constantly increasing share in the livestreaming market. Because Live2D animation technology features that production costs are low and a three-dimensional effect can be presented by using a two-dimensional image, the Live2D animation technology is usually used in production of a virtual online streamer.

SUMMARY

In view of the problem, some embodiments of the present application provide a data processing method. The present application also relates to a data processing apparatus, a computing device, and a computer-readable storage medium, so as to solve the security problem existing in a conventional technology that a core file of a virtual image is easily subjected to leakage.

According to a first aspect of some embodiments of the present application, a data processing method is provided, where the method is applied to a server, and includes:
receiving an object loading instruction for a target object;
obtaining computing resource information and rendering resource information corresponding to the target object based on the object loading instruction;
performing calculation based on the computing resource information to generate rendering data information; and
sending the rendering data information and the rendering resource information to a client.

According to a second aspect of some embodiments of the present application, a data processing method is provided, where the method is applied to a client, and includes:
receiving an object loading instruction for a target object, and sending the object loading instruction to a server;
receiving rendering data information and rendering resource information returned by the server; and
drawing the target object based on the rendering data information and the rendering resource information.

According to a third aspect of some embodiments of the present application, a data processing method is provided, where the method is applied to a data processing system which includes a client and a server, where
the client receives an object loading instruction for a target object, and sends the object loading instruction to the server;
the server receives the object loading instruction for the target object, obtains computing resource information and rendering resource information corresponding to the target object based on the object loading instruction, performs calculation based on the computing resource information to generate rendering data information, and sends the rendering data information and the rendering resource information to the client; and
the client receives the rendering data information and the rendering resource information, and draws the target object based on the rendering data information and the rendering resource information.

According to a fourth aspect of some embodiments of the present application, a data processing system is provided, where the system includes a client and a server, where
the client is configured to receive an object loading instruction, and send the object loading instruction to the server;
the server is configured to receive the object loading instruction for a target object, obtain computing resource information and rendering resource information corresponding to the target object based on the object loading instruction, perform calculation based on the computing resource information to generate rendering data information, and send the rendering data information and the rendering resource information to the client; and
the client is configured to receive the rendering data information and the rendering resource information, and draw the target object based on the rendering data information and the rendering resource information.

According to a fifth aspect of some embodiments of the present application, a computing device is provided, where the computing device includes a memory, a processor, and computer instructions stored in the memory and capable of running on the processor, where when the processor executes the computer instructions, the steps of the data processing method are implemented.

According to a sixth aspect of some embodiments of the present application, a computer-readable storage medium is provided, where the computer-readable storage medium stores computer instructions, and when the computer instructions are executed by a processor, the steps of the data processing method are implemented.

A data processing method according to the present application is applied to a server, and includes: receiving an object loading instruction for a target object; obtaining computing resource information and rendering resource information corresponding to the target object based on the object loading instruction; performing calculation based on the computing resource information to generate rendering data information; and sending the rendering data information and the rendering resource information to a client.

In some embodiments of the present application, a server obtains computing resource information and rendering resource information based on an object loading instruction, and calculates the computing resource information to generate rendering data information. The server sends the rendering resource information and the rendering data information to a client, so that the client runs rendering logic based on the rendering resource information and the rendering data information, and therefore a calculation process of a virtual image is executed on the server and a rendering process is executed on the client. Because the client only obtains resources and data required for rendering, leakage of a core file of the virtual image is prevented, and security of resource protection is improved. In addition, a speed of loading the virtual image for previewing by a user can be increased.

DESCRIPTION OF EMBODIMENTS

In the following description, numerous specific details are set forth to provide a full understanding of the present application. However, the present application can be implemented in many other modes different from those described herein, and a person skilled in the art can make similar promotion without departing from the connotation of the present application. Therefore, the present application is not limited by specific implementations disclosed below.

Terms used in one or more embodiments of the present application are merely for the purpose of describing a specific embodiment(s), and are not intended to limit the one or more embodiments of the present application. Singular forms "one", "the" and "this" used in one or more embodiments of the present application and the appended claims are also intended to include most forms unless another meaning is clearly indicated in a context. It should also be understood that, the term "and/or" used in one or more embodiments of the present application means and includes any one or all of possible combinations of one or more associated listed items.

It should be understood that although the terms "first", "second", etc. may be used in one or more embodiments of the present application to describe various information, the information should not be limited to these terms. These terms are only used to distinguish a same type of information from each other. For example, without departing from the scope of one or more embodiments of the present application, "first" may also be referred to as "second", and similarly, "second" may also be referred to as "first". Depending on the context, the word "if" as used herein may be interpreted as "when" or "in response to determining".

The terms involved in one or more embodiments of the present application are first explained.

Virtual online streamer: It means an online streamer who uses a virtual image to contribute or perform livestreaming on a video website.

Figure 1:
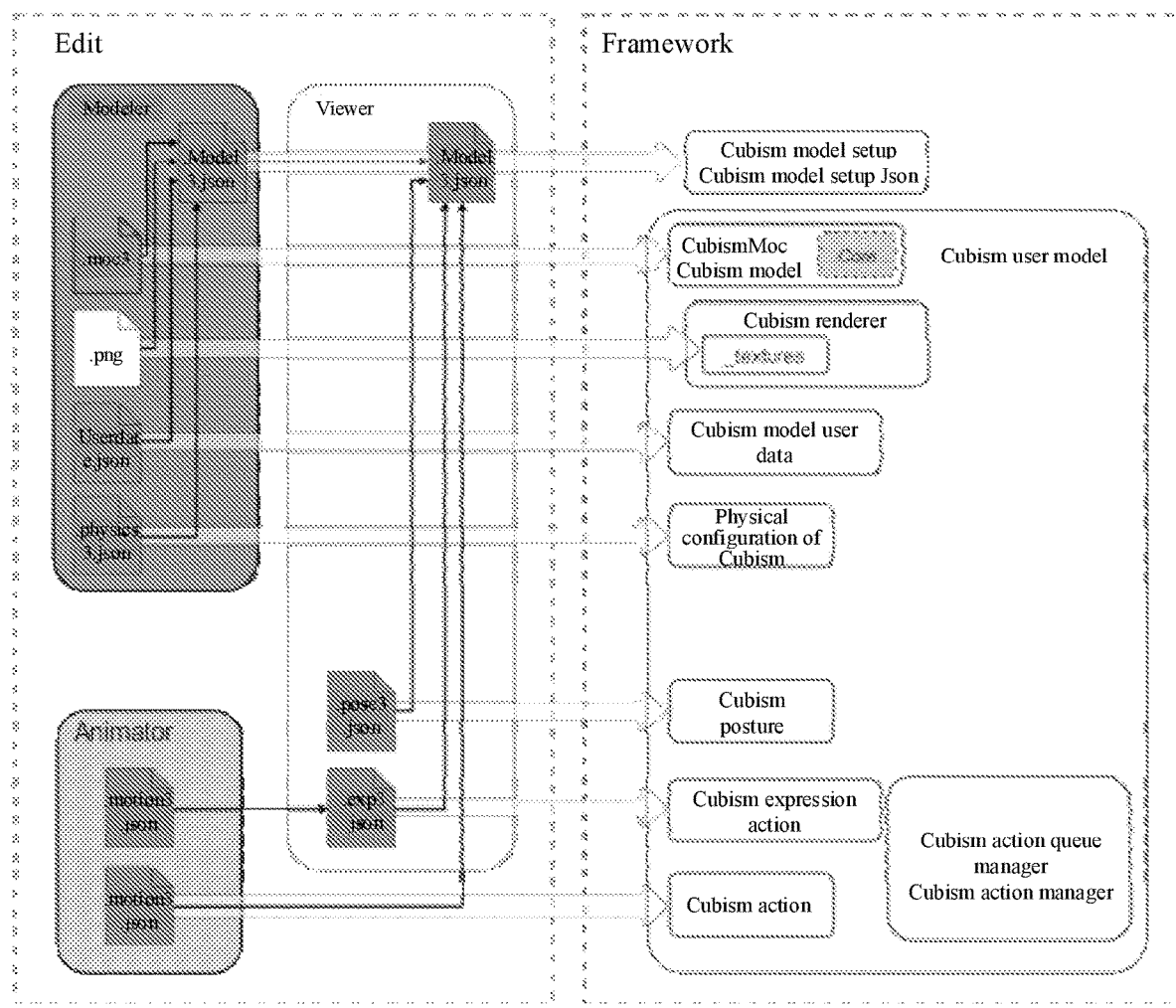
FIG. 1 is a structural diagram of a complete Live2D model resource according to some embodiments of the present application.

Live2D: An animation rendering technology, which generates a two-dimensional image similar to a three-dimensional model by using a series of continuous images and character modeling. Currently, most virtual images are rendered and drawn by using a Live2D rendering technology. FIG. 1 shows resource files of a complete Live2D model according to some embodiments of the present application. Specific meanings of the model resource files are shown in Table 1.

TABLE 1

| | |
|---|---|
| .moc3 | Including model metadata such as parameter vertex information, and participating in core processing of a model calculation process |
| .png | Material file of the model, storing color information required for rendering |
| .model3.json | Including a relative path of the entire Live2D model resource in a directory, and some configuration information needed for model operation |
| .userdata.json | User information set for art resources in the model |
| .physic3.json | Physical configuration of the model |
| .pose3.json | Component grouping information for model posture switching |
| .motion3.json | Model animation configuration and sequence frame information |
| .exp3.json | Expression configuration information of the model |
| .cdi3.json | Name and ID mapping of model parameters. If the name of the model Parameters needs to be displayed, the name can be obtained from this. |

WebGL and OpenGL: Graphics APIs for interacting with a GPU.

Texture: Picture file used to store color information in the model.

Vertex data information: Provided to a graphics API and associated with Texture, so as to draw a series of data of graphics on a canvas.

Rendering context: Example used to operate the graphics API to perform a rendering operation on the canvas.

Moc3: Core file for storing vertex information and other metadata in the Live2D model.

Model: Example of the loaded Moc3 file of Live2D, including parameter information of the model and vertex data information updated after each calculation.

Parameters: A series of data modified by a user in Live2D, and converted into variable vertex data information by using the API of Live2D.

Figure 2:
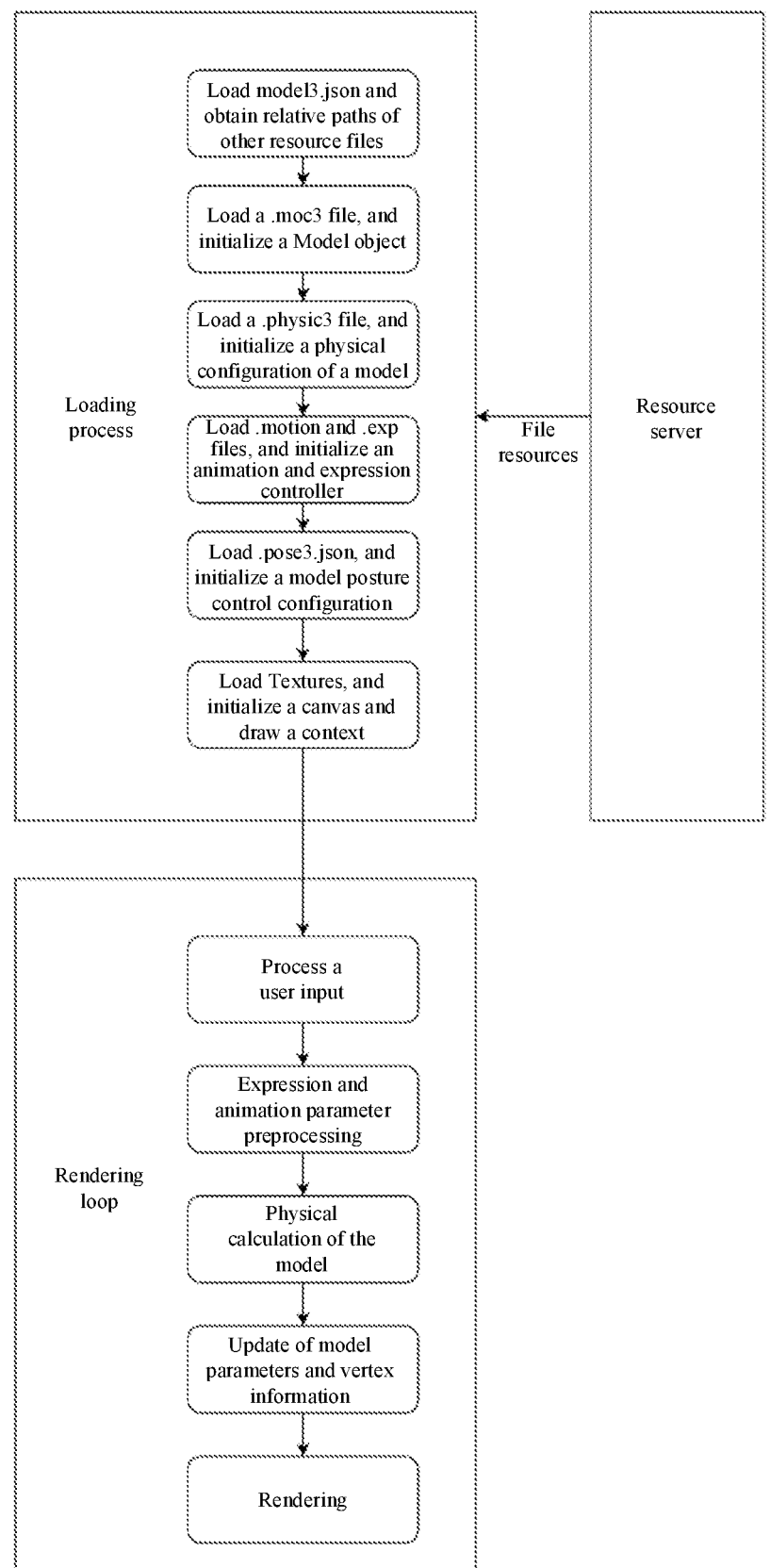
FIG. 2 is a flowchart of execution of a resource file loading process and a rendering loop process by a client according to some embodiments of the present application.

During transaction of a virtual image, due to complexity of a display effect, a complete model file usually needs to be interacted with a user, so that the user can load and render resources on a client, so as to preview the virtual image to ensure a use effect. However, because a core technology of Live2D cannot be open, a commonly used encryption method cannot sufficiently protect file resources of Live2D. Consequently, a core file of the virtual image is easily subjected to leakage, thereby damaging interests of a resource holder. Therefore, how to improve resource security during resource transaction is a current urgent problem to be solved. In a process of original preview of Live2D, loading and logic running of all resource files are performed on a client. A running process and resource acquisition are transparent to the user, and there is a risk of resource leakage. A specific process is shown in FIG. 2. FIG. 2 is a flowchart of execution of a resource file loading process and a rendering loop process by a client according to some embodiments of the present application. As previewing and transaction of a virtual image of Live2D are mostly performed in browsers, due to the openness of the browsers, commonly used data encryption methods are easily subjected to cracking by technical means, and there is a risk that an original file of the virtual image of Live2D displayed on the browsers are at risk of being illegally obtained. A Moc3 file, a core file in a Live2D file resource, cannot be modified and customized based on a service environment because a corresponding technology is not open. Once the file is leaked, any tool that supports the Live2D technology can directly use this resource, which will damage interests of a Live2D resource holder.

Due to a difference between levels of producing the virtual image of Live2D, there is a large difference between sizes of Live2D files. There may be a long loading time for some large-volume resources of a virtual image of Live2D because content of a complete file needs to be obtained for loading.

Based on this, to solve the foregoing problem, the present application provides a data processing method. The present application also relates to a data processing apparatus, a computing device, and a computer-readable storage medium, which will be described one by one in detail in the following embodiments.

Figure 3:
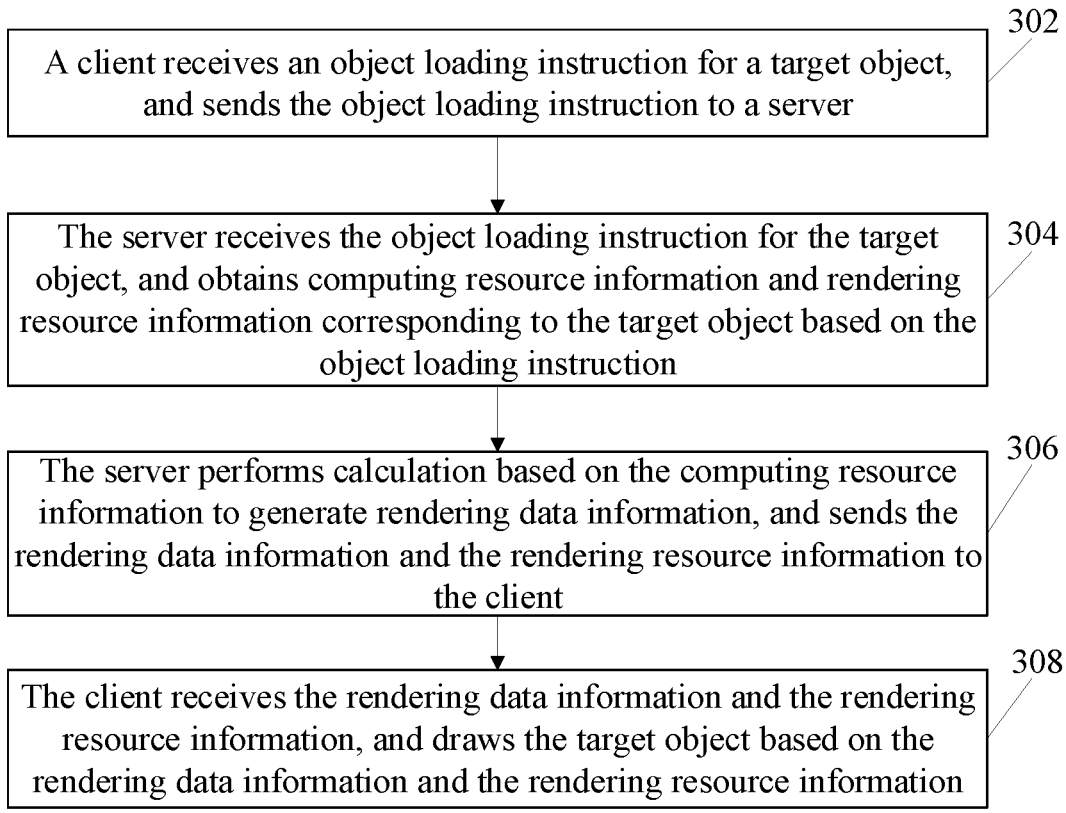
FIG. 3 is a flowchart of a data processing method applied to a data processing apparatus according to some embodiments of the present application.

FIG. 3 is a flowchart of a data processing method applied to a data processing system according to some embodiments of the present application. The system includes a server and a client, and the method specifically includes the following steps.

Step 302: The client receives an object loading instruction for a target object, and sends the object loading instruction to the server.

The object loading instruction may be understood as an instruction sent to the client when a user needs to preview a virtual image. The instruction includes, but is not limited to, parameters such as an identifier of the target object, animation of the target object, and an expression.

In practical application, after the user sends the object loading instruction for the target object to the client, the client presents an animated image of the target object to a customer. Specifically, the client sends the object loading instruction to the server to obtain a rendering resource file, so as to render the animated image of the target object for presentation to the user.

In a specific embodiment of the present application, when the user needs to preview an animated image of an object A, an object loading instruction of "Preview an object A" is inputted on the client, and after receiving the object loading instruction, the client sends the instruction to a server B.

Step 304: The server receives the object loading instruction for the target object, and obtains computing resource information and rendering resource information corresponding to the target object based on the object loading instruction.

The computing resource information may be understood as information such as a model animation parameter and a model physical parameter of the target object, for example, a moc3 file, a motion3.json file, an exp3.json file, and a physic3.json file. The server may calculate, based on the computing resource information, a rendering parameter needed for subsequent rendering by the client. The rendering resource information may be understood as a picture file of a model color of the target object, such as a Texture file. The client may draw an animated image of the target object based on the rendering resource information and the rendering parameter calculated by the server.

In practical application, after receiving the object loading instruction for the target object, the server may obtain the computing resource information and the rendering resource information of the target object. In addition, after the server receives the object loading instruction sent by the client, the server is connected to the client by using a transport protocol for persistent connection, to facilitate subsequent data interaction and message synchronization. A commonly used transport protocol for persistent connection includes WebSocket, UDP, Long poll, ajax polling, and the like.

In a specific embodiment of the present application, the client sends an object loading instruction to the server B, the server is connected to the client by using a Web Socket protocol, and the server B may obtain computing resource information and rendering resource information corresponding to the target object based on the object loading instruction. The computing resource information is computing files such as moc3, motion3.json, exp3.json, and physic3.json. The server can initialize Model after loading a moc3 file, can initialize an animation and expression controller after loading a motion3.json file and an exp3.json file, and can initialize a physical configuration after loading a physic3.json file. The rendering resource information is rendering files such as Texture and png. After loading a Texture file, the client can initialize a canvas and drawing the context.

In practical application, the server needs to generate a resource acquisition request based on the object loading instruction, and obtains corresponding resource information based on the resource acquisition request. The resource information includes computing resource information required for calculation by the server and rendering resource information required for rendering by the client.

Specifically, the obtaining computing resource information and rendering resource information corresponding to the target object based on the object loading instruction includes:

generating a resource acquisition request based on the object loading instruction; and obtaining the computing resource information and the rendering resource information corresponding to the target object in response to the resource acquisition request.

The resource acquisition request may be understood as a request for obtaining a specified resource of the target object. For example, the resource acquisition request may be to obtain the Texture file of the target object, or to obtain a model3.json file of the target object. The server obtains a corresponding resource file in response to the resource acquisition request.

In practical application, the server may determine identifier information of the target object based on the resource acquisition request, and search and obtain, from a resource database, the computing resource information and the rendering resource information corresponding to the target object based on the identifier of the target object.

Specifically, the obtaining the computing resource information and the rendering resource information corresponding to the target object in response to the resource acquisition request includes:

determining an identifier of the target object based on the resource acquisition request; and searching, from a resource database, the computing resource information and the rendering resource information corresponding to the target object based on the identifier of the target object.

The identifier of the target object may be understood as an identifier that represents identity information of the object. The identifier of the target object may be a name of the object, a unique number of the object, or the like. For example, an object identifier of the object A may be "name A", and an object identifier of the object B may be "No. 123". In specific implementation, a specific form of the identifier of the target object should be determined based on an actual situation. This is not specifically limited herein in the present application.

In practical application, after receiving the object loading instruction, the server obtains the identifier of the target object based on the object loading instruction, determines identity information of the target object based on the identifier of the target object, so as to find resource information of the target object from the resource database, and obtains required computing resource information and rendering resource information.

In a specific embodiment of the present application, following the foregoing example, when obtaining an object identifier "No. 10" of a target object A based on the object loading instruction, the server B searches for a resource file "No. 10" from the resource database, and obtains computing resource information and rendering resource information therein.

Step 306: The server performs calculation based on the computing resource information to generate rendering data information, and sends the rendering data information and the rendering resource information to the client.

The rendering data information may be understood as data information required during rendering by the client, and the rendering data information may be calculated by the server based on the computing resource information. The server completes running of computing logic based on the computing resource information, and sends the rendering data information and the rendering resource information obtained through calculation to the client, so that the client can complete running of rendering logic based on the rendering data information and the rendering resource information, so as to separate the computing logic from the rendering logic.

In practical application, the computing resource information is processed and operated by the server, and the rendering resource information is processed and operated by the client. After calculating the rendering data information based on the computing resource information, the server sends the rendering data information and the rendering resource information to the client, so that the client can complete the drawing and rendering of the target object only by obtaining the rendering data information and the rendering resource information required for rendering. In specific implementation, the rendering data information and the rendering resource information may be sent separately or simultaneously. A specific sending mode may be determined based on an actual situation. This is not specifically limited herein in the present application.

In a specific embodiment of the present application, following the foregoing example, the server B performs calculation based on the computing resource information to generate rendering data information of the target object A, and sends the rendering data information and the rendering resource information to the client.

Specifically, the performing calculation based on the computing resource information to generate rendering data information includes:

generating a resource calculation request based on the object loading instruction; and performing calculation based on the computing resource information in response to the resource calculation request, to generate the rendering data information.

The resource calculation request may be understood as a request including computing logic. For example, model parameters such as an animated expression of the virtual image are calculated.

In a specific embodiment of the present application, following the foregoing example, the server B generates a resource calculation request based on the object loading request, and performs calculation based on the computing resource information in response to the resource calculation request, to generate rendering data information of the target object A.

In practical application, the rendering data information includes vertex data information and static rendering data information. Therefore, the vertex data information needs to be calculated. Specifically, the performing calculation based on the computing resource information in response to the resource calculation request, to generate the rendering data information includes:

obtaining model parameter information and static rendering data information in the computing resource information in response to the resource calculation request;

calculating vertex data information based on the model parameter information; and generating the rendering data information based on the vertex data information and the static rendering data information.

The model parameter information may be understood as animation model parameters of the target object, for example, parameter information such as an animation parameter, an expression parameter, and a physical parameter; the static rendering data information may be understood as data information required when a static picture of the target object is rendered; and the vertex data information may be understood as data information of an image drawn on a canvas by the client, and the vertex data information is provided to WebGL and OpenGL and associated with Texture, so as to draw a series of data of graphics on the canvas.

In practical application, the static rendering data information is stored in the moc3 file, and the server may directly obtain the static rendering data information from the computing resource information, obtain relevant model parameter information based on the computing resource information, and calculate the vertex data information.

In a specific embodiment of the present application, the server B obtains model parameter information and static rendering data information from computing resource information in response to a resource calculation request, and the server B calculates vertex data information based on the model parameter information, packages the vertex data information and the static rendering data information to generate rendering data information, and sends the rendering data information to the client.

To facilitate data transmission to the client by the server, the rendering data information can be compressed to achieve a purpose of reducing a data volume, thereby making the transmission faster.

Specifically, the sending the rendering data information and the rendering resource information to the client includes:

compressing the rendering data information to generate compressed rendering data information; and sending the compressed rendering data information and the rendering resource information to the client.

The compressed rendering data information may be understood as rendering data information after compression.

In practical application, some resources of a virtual image of Live2D have an excessive volume, so that the rendering data information composed of vertex data information and static rendering data information has a very large data volume, thereby taking a long time for transmission. As a result, a lot of time for the user to load resources is required for previewing of the virtual image. Therefore, the vertex data information in the rendering data information may be compressed, and the compressed rendering data information has a smaller data volume than the previous rendering data information, thereby speeding up resource transmission.

In a specific embodiment of the present application, following the foregoing example, after calculating rendering data information, the server B compresses the rendering data information to generate compressed rendering data information, and sends the compressed rendering data information and the rendering resource information to the client.

In practical application, the rendering data information may be compressed by serialization. Specifically, the compressing the rendering data information to generate compressed rendering data information includes:

serializing the rendering data information to generate serialized rendering data information; and compressing the serialized rendering data information to generate the compressed rendering data information.

Serialization may be understood as a process of converting state information of an object into a form that can be stored or transmitted, for example, converting data information of a target object into binary data conforming to a computer language.

In a specific embodiment of the present application, following the foregoing example, the server B serializes the vertex data information in the rendering data information, generates serialized rendering data information based on serialized vertex data information and the static rendering data information, then compresses the serialized rendering data information to generate compressed rendering data information with a smaller data volume, and sends the compressed rendering data information and the rendering resource information to the client.

In another specific embodiment of the present application, following the foregoing example, the server B serializes the vertex data information and the static rendering data information in the rendering data information, generates serialized rendering data information based on serialized vertex data information and serialized static rendering data information, then compresses the serialized rendering data information to generate compressed rendering data information with a smaller data volume, and sends the compressed rendering data information and the rendering resource information to the client.

In specific implementation, during serialization, the format of the rendering data information may be converted to a format with a smaller storage capacity, thereby reducing the data volume. Specifically, the serializing the rendering data information to generate serialized rendering data information includes:

compressing the rendering data information to generate initial compressed rendering data information; and serializing the initial compressed rendering data information to generate the serialized rendering data information.

The initial compressed rendering data information may be understood as rendering data information after data format conversion. For example, for the same data, a memory size occupied by Float64 is twice that occupied by Float32 and four times that occupied by Float16.

In practical application, the vertex data information in the Float32 format may be converted into the Float16 format, thereby reducing the data size by a half. Then, the vertex data information in the Float16 format is serialized, and all kinds of vertex data are serialized into a piece of complete binary data.

In a specific embodiment of the present application, following the foregoing example, the server B first converts the vertex data information in the rendering data information from the Float32 format to the Float16 format to generate initial compressed vertex data information, then serializes the initial compressed vertex data information in the Float16 format to splice all vertex data into a piece of complete binary data, and generates serialized rendering data information based on the serialized vertex data information and the static rendering data information.

In another specific embodiment of the present application, following the foregoing example, the server B first converts the vertex data information and the static rendering data information in the rendering data information from the Float32 format to the Float16 format to generate compressed initial vertex data information and initial compressed static rendering data information, then serializes the compressed initial vertex data information and the initial compressed static rendering data information in the Float16 format to splice all vertex data into a piece of complete binary data, and generates serialized rendering data information based on serialized vertex data information and serialized static rendering data information.

During serialization, if the rendering data information is serialized for the first time, the current rendering data information is directly serialized to generate first serialized rendering data information, and the first serialized rendering data information obtained after serialization is compressed to generate compressed rendering data information. If it is not for first time that the rendering data information is serialized, the serialized rendering data information is compared with the previous serialized rendering data information corresponding to the current serialized rendering data information to generate serialized rendering difference data information.

Specifically, the compressing the serialized rendering data information to generate the compressed rendering data information includes:

determining whether the serialized rendering data information is first serialized rendering data information; and if yes, compressing the serialized rendering data information to generate the compressed rendering data information; or if not, comparing the serialized rendering data information with previous serialized rendering data information to generate serialized rendering difference data information, and compressing the serialized rendering difference data information to generate the compressed rendering data information.

The previous serialized rendering data information may be understood as previous serialized rendering data information corresponding to the current serialized rendering data information. For example, the previous serialized rendering data information of second serialized rendering data information is the first serialized rendering data information; and the previous serialized rendering data information of third serialized rendering data information is the second serialized rendering data information.

The serialized rendering difference data information may be understood as serialized rendering data information generated after an XOR operation between the current serialized rendering data information and the previous serialized rendering data information. The purpose is to zero unchanged data bits, so that compression can be performed better.

In practical application, if the server serializes a resource file of an object for the first time, serialized rendering data information is first serialized rendering data information, and the first serialized rendering data information is compressed. If it is not for the first time that the server serializes a resource file of the same object, the current serialized rendering data information is compared with the previous serialized rendering data information, that is, two pieces of binary data are XOR-processed, and unchanged data bits between the two pieces of serialized rendering data information are zeroed, so that the data volume is reduced for better compression. The compression mode may be to convert into a coding mode with a smaller storage capacity. For example, an original coding mode is ASCII, which is converted into a UTF-8 coding mode.

In a specific embodiment of the present application, following the foregoing example, the server B determines whether the serialized rendering data information is the first serialized rendering data information, and if the current serialized rendering data information is serialized rendering data information that is generated by first serialization performed by the server B on the rendering data information of the target object A, the server B determines that the current serialized rendering data information is the first serialized rendering data information, and directly compresses the current serialized rendering data information to generate compressed rendering data information.

In another specific embodiment of the present application, following the foregoing example, the server B determines whether the serialized rendering data information is the first serialized rendering data information, and if the current serialized rendering data information is not serialized rendering data information that is generated by first serialization performed by the server B on the rendering data information of the target object A, the server B performs an XOR operation on the current serialized rendering data information and the previous serialized rendering data information corresponding thereto to generate serialized rendering difference data information, and compresses the serialized rendering difference data information.

In the present application, after non-first serialized rendering data information and previous serialized rendering data information corresponding thereto are XOR-processed, same data bits between the serialized rendering data information and the previous serialized rendering data information may be zeroed to generate a piece of serialized rendering difference data information for better compression.

If the user actively inputs a request for modifying the virtual image, the server may recalculate the rendering data information based on the request and send recalculated rendering data information to the client, so that the client draws a picture that meets user expectations.

Specifically, the method further includes:

receiving an object adjustment request, and generating resource adjustment information based on the object adjustment request; and calculating rendering data information based on the resource adjustment information and the computing resource information, and sending the rendering data information and the rendering resource information to the client.

The object adjustment request may be understood as the user's request for adjusting the target object to a desired image. For example, if an image of the target object is waving, and the user needs to adjust the image so that the target object does not wave, the user may send an object adjustment request to the client to adjust the image of the target object.

In practical application, the user may obtain a name of a Live2D model parameter by loading a cdi3.json file, and modify Parameters of the model to adjust the image of the target object. Specifically, after modifying data, the user sends an object adjustment request to the client; after receiving the object adjustment request sent by the user, the client may send the object adjustment request to the server; after receiving the object adjustment request, the server may generate resource adjustment information based on the object adjustment request, calculate rendering data information by using the resource adjustment information and the computing resource information, and send adjusted rendering data information and rendering resource information to the client; and based on the rendering data information and the resource information, the client can draw a picture that meets user expectations.

In a specific embodiment of the present application, following the foregoing example, if the user needs eyes of the target object A to be closed, the user sends an object adjustment request for the target object A, and the object adjustment request is "Adjust eyes to be closed"; the client forwards the received object adjustment request to the server B, and after receiving the object adjustment request, the server B may generate resource adjustment information, calculate rendering data information based on the resource adjustment information and the computing resource information, where vertex data information in the rendering data information already meets user expectations, and the server B sends the rendering data information and the rendering resource information to the client, so that the client can draw the target object A that meets the user expectations.

Step 308: The client receives the rendering data information and the rendering resource information, and draws the target object based on the rendering data information and the rendering resource information.

The rendering data information is calculated by the server and includes vertex data information and static rendering data information. The rendering resource information may be understood as a picture file of a model color of the target object, such as a Texture file. The client may draw an animated image of the target object based on the rendering resource information and the rendering parameter calculated by the server, and then render the animated image, and rendering logic of the target object runs on the client, so as to present the animated image of the target object to the user.

In practical application, the server is responsible for a calculation process, and the client is responsible for a rendering process, that is, calculation logic runs on the server, and rendering logic runs on the client. After the server completes the calculation and sends the rendering data information and the rendering resource information to the client, the client needs to first load the rendering resource information, initialize a canvas and draw a context, and render the context based on the rendering data information, so as to complete the rendering. After the rendering is completed, the current rendering parameters may be saved, to generate parameter files such as Model and motion corresponding to the current drawing of the target object. Therefore, the client can complete the rendering of the target object only by loading and rendering the rendering resource information and the rendering data information. This fundamentally eliminates the possibility that another file resource of the virtual image of Live2D is obtained at the client, and ensures resource security of the virtual image of Live2D.

In a specific embodiment of the present application, following the foregoing example, the client receives the rendering data information and the rendering resource information sent by the server B, loads the Texture file in the rendering resource information, initializes the picture and draws the context, and then renders the context based on the rendering data information.

If the rendering data information received by the client has been compressed by the server, the rendering data information needs to be first decompressed. Specifically, the rendering data information includes compressed rendering data information; and the drawing the target object based on the rendering data information and the rendering resource information includes:
decompressing the compressed rendering data information to obtain to-be-rendered data information; and
drawing the target object based on the to-be-rendered data information and the rendering resource information.

The compressed rendering data information may be understood as rendering data information after compression. The to-be-rendered data information may be understood as rendering data information after the compressed rendering data information is decompressed.

In practical application, to increase a transmission speed, the server may reduce the data volume of transmitted data by compression. Therefore, the rendering data information obtained by the client is compressed rendering data information, and the client needs to decompress the rendering data information, to facilitate subsequent drawing of the target object.

In a specific embodiment of the present application, following the foregoing example, if the client receives compressed rendering data information, the client first decompresses the compressed rendering data information to obtain to-be-rendered data information, and draws the target object based on the to-be-rendered data information and the rendering resource information.

Specifically, the compressed rendering data information includes serialized rendering data information; and
the decompressing the compressed rendering data information to obtain to-be-rendered data information includes:
decompressing the compressed rendering data information to obtain the serialized rendering data information;
determining whether the serialized rendering data information is first serialized rendering data information; and
if yes, deserializing the decompressed rendering data information to obtain to-be-rendered data information; or
if not, generating serialized to-be-rendered data information based on the serialized rendering data information and previous serialized rendering data information, and deserializing the serialized to-be-rendered data information to obtain the to-be-rendered data information.

The to-be-rendered data information may be understood as rendering data information before serialization, that is, serialized rendering data information after deserialization.

In practical application, after receiving the compressed serialized rendering data information, the client needs to perform operations such as decompression and deserialization on the compressed serialized rendering data information. In addition, when the serialized rendering data information is serialized rendering difference data information, current serialized rendering data information needs to be generated based on the serialized rendering difference data information and the previous serialized rendering data information.

In a specific embodiment of the present application, after receiving the compressed rendering data information, the client decompresses the compressed rendering data information to obtain a piece of serialized rendering data information, determines whether the serialized rendering data information is first serialized rendering data information, and deserializer, if the serialized rendering data information is the first serialized rendering data information, the current serialized rendering data information to generate to-be-rendered data information.

In a specific embodiment of the present application, following the foregoing example, after receiving the compressed rendering data information, the client decompresses the compressed rendering data information to obtain a piece of serialized rendering data information, determines whether the serialized rendering data information is first serialized rendering data information, determines, if the serialized rendering data information is not the first serialized rendering data information, that current serialized rendering data information is serialized rendering difference data information, generates the current serialized rendering data information based on the serialized rendering difference data information and the previous serialized rendering data information, and deserializes the current serialized rendering data information to obtain to-be-rendered data information.

A data processing method according to the present application is applied to a data processing system, where the system includes a server and a client, and the method includes: The client receives an object loading instruction for a target object, and sends the object loading instruction to the server; the server receives the object loading instruction for the target object, obtains computing resource information and rendering resource information corresponding to the target object based on the object loading instruction, performs calculation based on the computing resource information to generate rendering data information, and sends the rendering data information and the rendering resource information to the client; and the client receives the rendering data information and the rendering resource information, and draws the target object based on the rendering data information and the rendering resource information. The server obtains the computing resource information and executes a calculation process, and sends the calculated rendering data information to the client, and the client only needs to obtain the rendering resource information and the rendering data information and execute a rendering process, so as to separate the calculation process from the rendering process, thereby fundamentally eliminating the possibility that a core resource file of a virtual image is obtained at the client, and ensuring resource security of the virtual image. The execution of the resource loading and calculation process by the server and the execution of the rendering process by the client can increase a loading speed and shorten a time required for previewing the virtual image.

Figure 4:
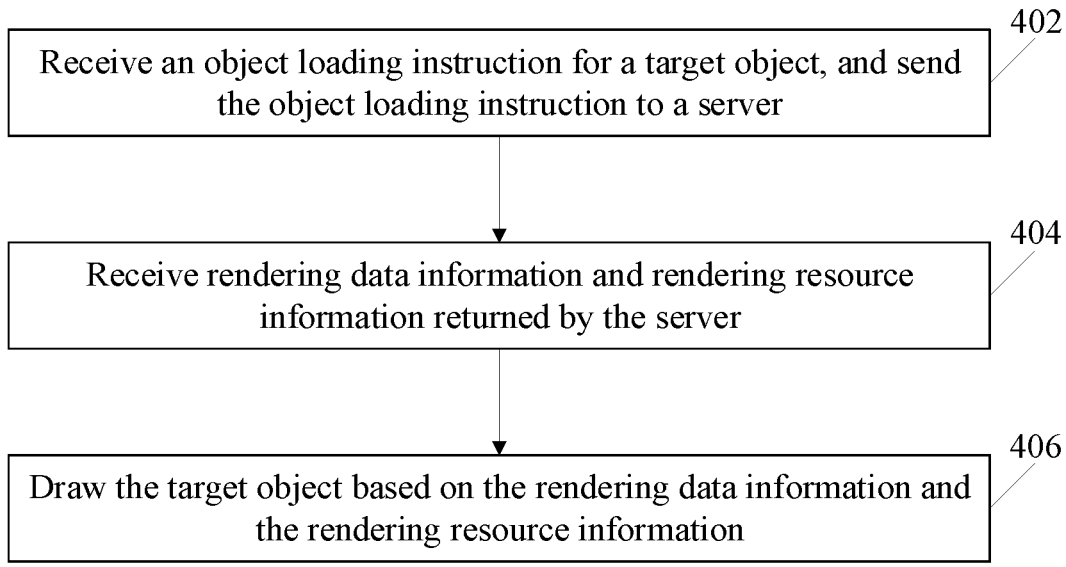
FIG. 4 is a flowchart of a data processing method applied to a client according to some embodiments of the present application.

FIG. 4 is a flowchart of a data processing method applied to a client according to some embodiments of the present application. The method specifically includes the following steps.

Step 402: Receive an object loading instruction for a target object, and send the object loading instruction to a server.

In a specific embodiment of the present application, a client receives an object loading instruction for a target object B, and sends the object loading instruction for the target object B to the server.

Step 404: Receive rendering data information and rendering resource information returned by the server.

In a specific embodiment of the present application, following the foregoing example, after calculating rendering data information, the server sends the rendering data information and the rendering resource information to the client, and the client receives the rendering data information and the rendering resource information sent by the server.

Step 406: Draw the target object based on the rendering data information and the rendering resource information.

In a specific embodiment of the present application, following the foregoing example, the client draws a target object A based on the rendering data information and the rendering resource information returned by the server and displays the target object A to a user.

In practical application, if the rendering data information returned by the server has been compressed, the rendering data information needs to be decompressed. Specifically, the rendering data information includes compressed rendering data information; and the drawing the target object based on the rendering data information and the rendering resource information includes:
decompressing the compressed rendering data information to obtain to-be-rendered data information; and
drawing the target object based on the to-be-rendered data information and the rendering resource information.

In a specific embodiment of the present application, following the foregoing example, the client decompresses the compressed rendering data information to obtain to-be-rendered data information, and draws the target object based on the to-be-rendered data information and the rendering resource information.

In practical application, if the server serializes the rendering resource information, after receiving the compressed rendering data information, the client needs to first decompress and then deserialize the compressed rendering data information. Specifically, the compressed rendering data information includes serialized rendering data information; and the decompressing the compressed rendering data information to obtain to-be-rendered data information includes:
decompressing the compressed rendering data information to obtain the serialized rendering data information;
determining whether the serialized rendering data information is first serialized rendering data information; and
if yes, deserializing the decompressed rendering data information to obtain to-be-rendered data information; or
if not, generating serialized to-be-rendered data information based on the serialized rendering data information and previous serialized rendering data information, and deserializing the serialized to-be-rendered data information to obtain the to-be-rendered data information.

In a specific embodiment of the present application, following the foregoing example, after receiving the compressed rendering data information, the client decompresses the compressed rendering data information to obtain a piece of serialized rendering data information, determines whether the serialized rendering data information is first serialized rendering data information, determines, if the serialized rendering data information is not the first serialized rendering data information, that current serialized rendering data information is serialized rendering difference data information, generates the current serialized rendering data information based on the serialized rendering difference data information and the previous serialized rendering data information, and deserializer the current serialized rendering data information to obtain to-be-rendered data information.

A data processing method according to the present application is applied to a client and includes: receiving an object loading instruction for a target object, and sending the object loading instruction to a server; receiving rendering data information and rendering resource information returned by the server; and drawing the target object based on the rendering data information and the rendering resource information. The client only receives the rendering data information and the rendering resource information required for rendering, which prevents leakage of a core resource file of a virtual image at the client, ensures resource security of the virtual image of Live2D, reduces the time for the client to load resource files and a transmission amount of transmitted resource files, speeds up drawing of the virtual image, and improves user experience.

Figure 5:
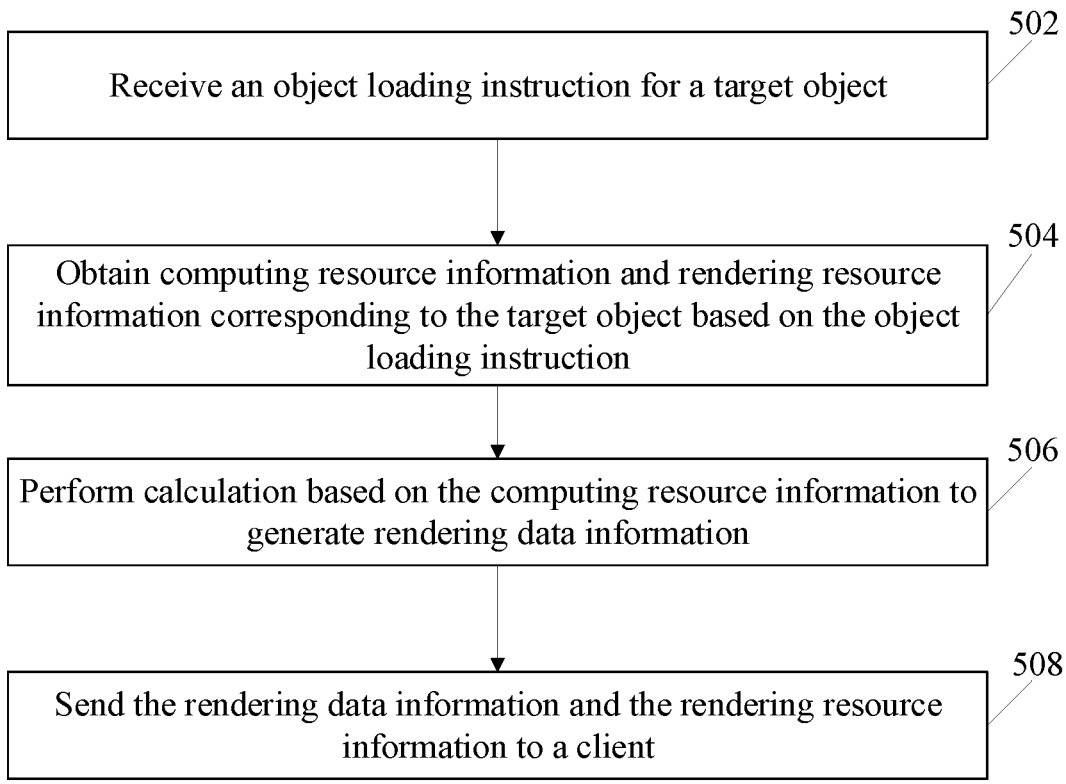
FIG. 5 is a flowchart of a data processing method applied to a server according to some embodiments of the present application.

FIG. 5 is a flowchart of a data processing method applied to a server according to some embodiments of the present application. The method specifically includes the following steps.

Step 502: Receive an object loading instruction for a target object.

In a specific embodiment of the present application, a server A receives an object loading instruction for a target object "Zhang San".

Step 504: Obtain computing resource information and rendering resource information corresponding to the target object based on the object loading instruction.

In a specific embodiment of the present application, the server A obtains computing resource information and rendering resource information corresponding to the target object "Zhang San" based on the object loading instruction.

Optionally, the obtaining computing resource information and rendering resource information corresponding to the target object based on the object loading instruction includes:
generating a resource acquisition request based on the object loading instruction; and
obtaining the computing resource information and the rendering resource information corresponding to the target object in response to the resource acquisition request.

Optionally, the obtaining the computing resource information and the rendering resource information corresponding to the target object in response to the resource acquisition request includes:
determining an identifier of the target object based on the resource acquisition request; and
searching, from a resource database, the computing resource information and the rendering resource information corresponding to the target object based on the identifier of the target object.

In a specific embodiment of the present application, the server A generates a resource acquisition request corresponding to the target object "Zhang San" based on the object loading instruction, and the server A obtains the computing resource information and the rendering resource information of the target object "Zhang San" in response to the resource acquisition request.

Step 506: Perform calculation based on the computing resource information to generate rendering data information.

In a specific embodiment of the present application, following the foregoing example, the server A calculates rendering data information based on the computing resource information.

Optionally, the performing calculation based on the computing resource information to generate rendering data information includes:
  generating a resource calculation request based on the object loading instruction; and
  performing calculation based on the computing resource information in response to the resource calculation request, to generate the rendering data information.

In a specific embodiment of the present application, following the foregoing example, the server A generates a resource calculation request based on the object loading instruction, and the server A calculates the computing resource information in response to the resource calculation request, to generate rendering data information.

Optionally, the performing calculation based on the computing resource information in response to the resource calculation request, to generate the rendering data information includes:
  obtaining model parameter information and static rendering data information in the computing resource information in response to the resource calculation request;
  calculating vertex data information based on the model parameter information; and
  generating the rendering data information based on the vertex data information and the static rendering data information.

In a specific embodiment of the present application, following the foregoing example, the server A obtains model parameter information and static rendering data information from computing resource information in response to a resource calculation request, and the server A calculates vertex data information based on the model parameter information, packages the vertex data information and the static rendering data information to generate rendering data information, and sends the rendering data information to the client.

Step 508: Send the rendering data information and the rendering resource information to a client.

In a specific embodiment of the present application, after calculating rendering data information, the server A sends the rendering data information and the rendering resource information to the client.

Optionally, the sending the compressed rendering data information and the rendering resource information to the client includes:
  compressing the rendering data information to generate compressed rendering data information; and
  sending the compressed rendering data information and the rendering resource information to the client.

In a specific embodiment of the present application, the server A compresses the rendering data information to generate compressed rendering data information, and sends the compressed rendering data information and the rendering resource information to the client. The rendering data information after compression has a smaller data volume, thereby speeding up the transmission.

Optionally, the compressing the rendering data information to generate compressed rendering data information includes:
  serializing the rendering data information to generate serialized rendering data information; and
  compressing the serialized rendering data information to generate the compressed rendering data information.

In a specific embodiment of the present application, following the foregoing example, to facilitate transmission, the server A serializes the rendering data information before data transmission, converts the rendering data information into binary data, generates serialized rendering data information, and then compresses the serialized rendering data information to generate compressed rendering data information.

Optionally, the serializing the rendering data information to generate serialized rendering data information includes:
  compressing the rendering data information to generate initial compressed rendering data information; and
  serializing the initial compressed rendering data information to generate the serialized rendering data information.

In a specific embodiment of the present application, to reduce a volume of integrally transmitted data, the server A first performs compression once during serialization, that is, converts rendering data information in a Float32 format into rendering data information in a Float16 format to generate initial compressed rendering data information, and then serialize the initial compressed rendering data information to generate serialized rendering data information.

Optionally, the compressing the serialized rendering data information to generate the compressed rendering data information includes:
  determining whether the serialized rendering data information is first serialized rendering data information; and
  if yes, compressing the serialized rendering data information to generate the compressed rendering data information; or
  if not, comparing the serialized rendering data information with previous serialized rendering data information to generate serialized rendering difference data information, and compressing the serialized rendering difference data information to generate the compressed rendering data information.

In a specific embodiment of the present application, following the foregoing example, the server A determines whether the serialized rendering data information is the first serialized rendering data information, and if the current serialized rendering data information is serialized rendering data information that is generated by first serialization performed by the server A on the rendering data information of the target object "Zhang San", the server A determines that the current serialized rendering data information is the first serialized rendering data information, and directly compresses the current serialized rendering data information to generate compressed rendering data information. If the current serialized rendering data information is not serialized rendering data information that is generated by first serialization performed by the server A on the rendering data information of the target object "Zhang San", an XOR operation is performed on the current serialized rendering data information and the previous serialized rendering data information corresponding thereto to generate serialized rendering difference data information, and the serialized rendering difference data information is compressed to generate compressed rendering data information.

Optionally, the method further includes:
receiving an object adjustment request, and generating resource adjustment information based on the object adjustment request; and
calculating rendering data information based on the resource adjustment information and the computing resource information, and sending the rendering data information and the rendering resource information to the client.

In a specific embodiment of the present application, when the user needs to make some changes to "Zhang San" after previewing the virtual image of "Zhang San" from the client, an object adjustment request may be issued to the client; after receiving the object adjustment request, the client forwards the object adjustment request to the server, and the server generates resource adjustment information based on the object adjustment request, calculates rendering data information based on the resource adjustment information and the computing resource information, and sends the calculated rendering data information and the rendering resource information to the client, so that the client draws a virtual image that meets user expectations.

A data processing method according to the present application is applied to a server, and the method includes: receiving an object loading instruction for a target object; obtaining computing resource information and rendering resource information corresponding to the target object based on the object loading instruction; performing calculation based on the computing resource information to generate rendering data information; and sending the rendering data information and the rendering resource information to a client. The server executes resource loading and computing logic running required for Live2D calculation to prevent leakage of core resources of the virtual image, and transmitted resource files are compressed to improve data transmission efficiency and browsing experience of corresponding users.

Figure 6:
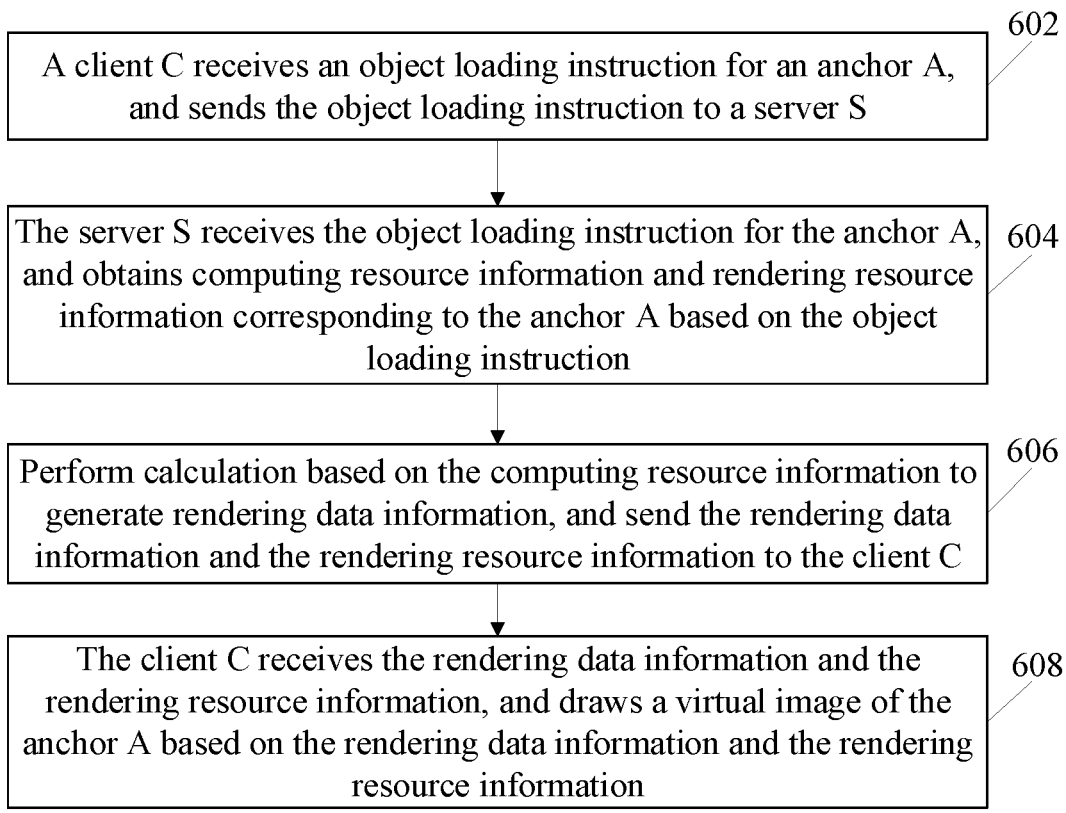
FIG. 6 is a processing flowchart of a data processing method applied to previewing of a virtual image of an online streamer A according to some embodiments of the present application.

With reference to FIG. 6, the data processing method according to the present application is further described below by taking an example of application of the data processing method according to the present application to previewing of a virtual image of an online streamer A. FIG. 6 is a processing flowchart of a data processing method applied to previewing of a virtual image of an online streamer A according to some embodiments of the present application. The method specifically includes the following steps.

Step 602: A client C receives an object loading instruction for an online streamer A, and sends the object loading instruction to a server S.

In a specific embodiment of the present application, the client C receives an object loading instruction for a virtual image of the online streamer A, which is sent by a user and indicates that the user needs to preview the virtual image of the online streamer A at this time, and the client C sends the object loading instruction to the server S.

Step 604: The server S receives the object loading instruction for the online streamer A, and obtains computing resource information and rendering resource information corresponding to the online streamer A based on the object loading instruction.

In a specific embodiment of the present application, following the foregoing example, after receiving the object loading instruction for the online streamer A, the server S obtains computing resource information and rendering resource information corresponding to the online streamer A based on the object loading instruction. Specifically, the step that the server S obtains computing resource information and rendering resource information corresponding to the online streamer A based on the object loading instruction is the same as the step in the foregoing data processing method, and is not repeatedly described herein in the present application.

Step 606: Perform calculation based on the computing resource information to generate rendering data information, and send the rendering data information and the rendering resource information to the client C.

In a specific embodiment of the present application, following the foregoing example, the server S performs calculation based on the computing resource information to generate rendering data information, and sends the rendering data information and the rendering resource information to the client C. Specifically, to shorten the transmission time and reduce the transmission amount, the server S may compress the rendering data information. For a specific compression method, reference may be made to the foregoing data processing method. This is not repeatedly described herein in the present application.

Step 608: The client C receives the rendering data information and the rendering resource information, and draws a virtual image of the online streamer A based on the rendering data information and the rendering resource information.

In a specific embodiment of the present application, following the foregoing example, the client C receives the rendering data information and the rendering resource information, and may draw the target object based on the rendering data information and the rendering resource information.

A method for previewing a virtual image of an online streamer A according to the present application includes: A client C receives an object loading instruction for the online streamer A, and sends the object loading instruction to a server S. The server S receives the object loading instruction for the online streamer A, and obtains computing resource information and rendering resource information corresponding to the online streamer A based on the object loading instruction. Calculation is performed based on the computing resource information to generate rendering data information, and the rendering data information and the rendering resource information are sent to the client C. The client C receives the rendering data information and the rendering resource information, and draws a virtual image of the online streamer A based on the rendering data information and the rendering resource information. The server executes a calculation process and the client executes a rendering process, so that the calculation process and the rendering process for loading the virtual image are separated, which prevents the client from obtaining another core resource file other than resource files required for rendering, and ensures security of resource files of the virtual image.

Figure 7:
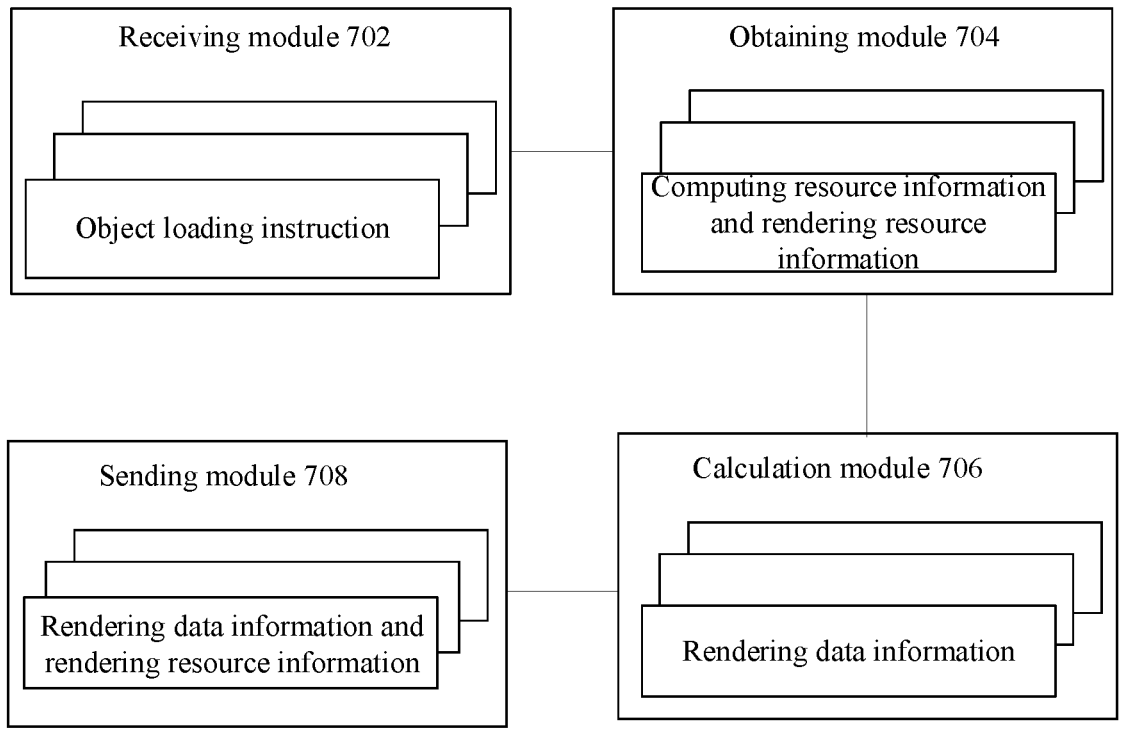
FIG. 7 is a schematic structural diagram of a data processing apparatus applied to a server according to some embodiments of the present application.

Corresponding to the foregoing method embodiment, the present application further provides some embodiments of a data processing apparatus applied to a server. FIG. 7 is a schematic structural diagram of a data processing apparatus applied to a server according to some embodiments of the present application. As shown in FIG. 7, the apparatus includes:

a receiving module 702, configured to receive an object loading instruction for a target object;

an obtaining module 704, configured to obtain computing resource information and rendering resource information corresponding to the target object based on the object loading instruction;

a calculation module 706, configured to perform calculation based on the computing resource information to generate rendering data information; and a sending module 708, configured to send the rendering data information and the rendering resource information to a client.

Optionally, the obtaining module 704 is further configured to generate a resource acquisition request based on the object loading instruction; and obtain the computing resource information and the rendering resource information corresponding to the target object in response to the resource acquisition request.

Optionally, the obtaining module 704 is further configured to determine an identifier of the target object based on the resource acquisition request; and search, from a resource database, the computing resource information and the rendering resource information corresponding to the target object based on the identifier of the target object.

Optionally, the calculation module 706 is further configured to generate a resource calculation request based on the object loading instruction; and perform calculation based on the computing resource information in response to the resource calculation request, to generate the rendering data information.

Optionally, the calculation module 706 is further configured to obtain model parameter information and static rendering data information in the computing resource information in response to the resource calculation request; calculate vertex data information based on the model parameter information; and generate the rendering data information based on the vertex data information and the static rendering data information.

Optionally, the sending module 708 is further configured to compress the rendering data information to generate compressed rendering data information; and send the compressed rendering data information and the rendering resource information to the client.

Optionally, the sending module 708 is further configured to serialize the rendering data information to generate serialized rendering data information; and compress the serialized rendering data information to generate the compressed rendering data information.

Optionally, the sending module 708 is further configured to compress the rendering data information to generate initial compressed rendering data information; and serialize the initial compressed rendering data information to generate the serialized rendering data information.

Optionally, the sending module 708 is further configured to determine whether the serialized rendering data information is first serialized rendering data information; and if yes, compress the serialized rendering data information to generate the compressed rendering data information; or if not, compare the serialized rendering data information with previous serialized rendering data information to generate serialized rendering difference data information, and compress the serialized rendering difference data information to generate the compressed rendering data information.

Optionally, the apparatus further includes: an adjustment module, configured to receive an object adjustment request, and generate resource adjustment information based on the object adjustment request; and calculate rendering data information based on the resource adjustment information and the computing resource information, and send the rendering data information and the rendering resource information to the client.

A data processing apparatus applied to a server according to the present application includes: a receiving module 702, configured to receive an object loading instruction for a target object; an obtaining module 704, configured to obtain computing resource information and rendering resource information corresponding to the target object based on the object loading instruction; a calculation module 706, configured to perform calculation based on the computing resource information to generate rendering data information; and a sending module 708, configured to send the rendering data information and the rendering resource information to a client. The server executes resource loading and computing logic running required for Live2D calculation to prevent leakage of core resources of the virtual image, and transmitted resource files are compressed to improve data transmission efficiency and browsing experience of corresponding users.

Figure 8:
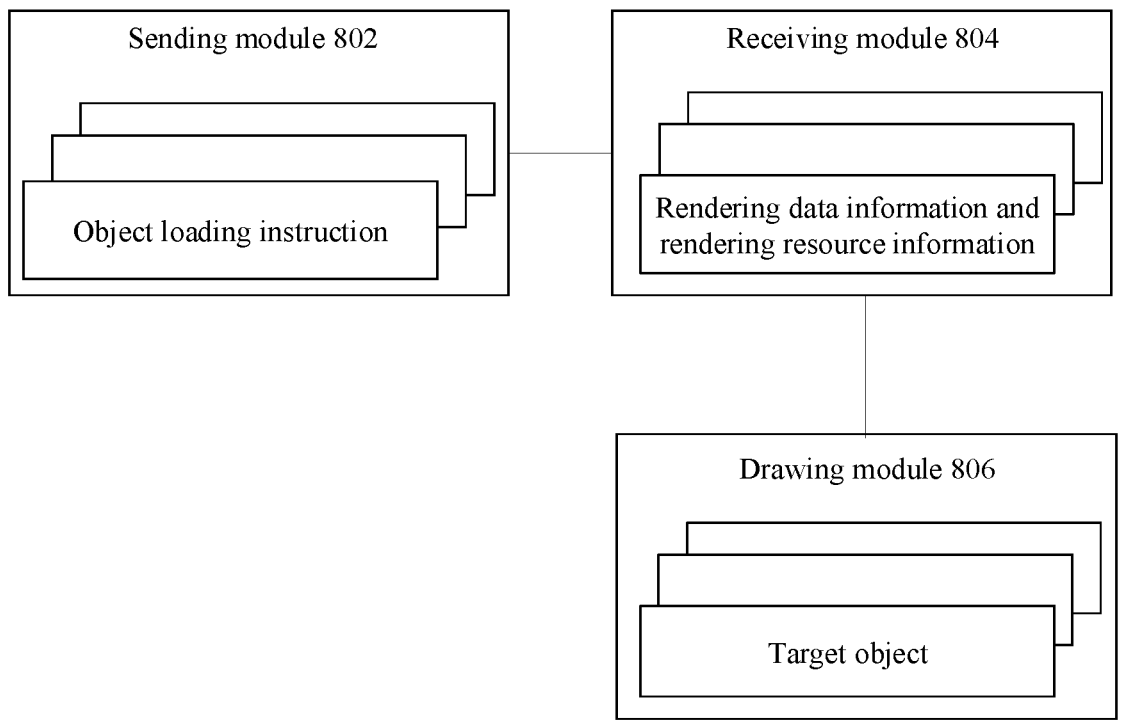
FIG. 8 is a schematic structural diagram of a data processing apparatus applied to a client according to some embodiments of the present application.

Corresponding to the foregoing method embodiment, the present application further provides some embodiments of a data processing apparatus applied to a client. FIG. 8 is a schematic structural diagram of a data processing apparatus applied to a client according to some embodiments of the present application. As shown in FIG. 8, the apparatus includes:

a sending module 802, configured to receive an object loading instruction for a target object, and send the object loading instruction to a server;

a receiving module 804, configured to receive rendering data information and rendering resource information returned by the server; and a drawing module 806, configured to draw the target object based on the rendering data information and the rendering resource information.

Optionally, the drawing module 806 is further configured to decompress the compressed rendering data information to obtain to-be-rendered data information; and draw the target object based on the to-be-rendered data information and the rendering resource information.

Optionally, the drawing module 806 is further configured to decompress the compressed rendering data information to obtain the serialized rendering data information; determine whether the serialized rendering data information is first serialized rendering data information; and if yes, deserialize the decompressed rendering data information to obtain to-be-rendered data information; or if not, generate serialized to-be-rendered data information based on the serialized rendering data information and previous serialized rendering data information, and deserialize the serialized to-be-rendered data information to obtain the to-be-rendered data information.

A data processing apparatus applied to a client according to the present application includes: a sending module 802, configured to receive an object loading instruction for a target object, and send the object loading instruction to a server; a receiving module 804, configured to receive rendering data information and rendering resource information returned by the server; and a drawing module 806, configured to draw the target object based on the rendering data information and the rendering resource information. The client only receives resource files required for rendering, which prevents leakage of a core resource file of a virtual image at the client, ensures resource security of the virtual image of Live2D, reduces the time for the client to load resource files and a transmission amount of transmitted resource files, speeds up drawing of the virtual image, and improves user experience.

Figure 9:
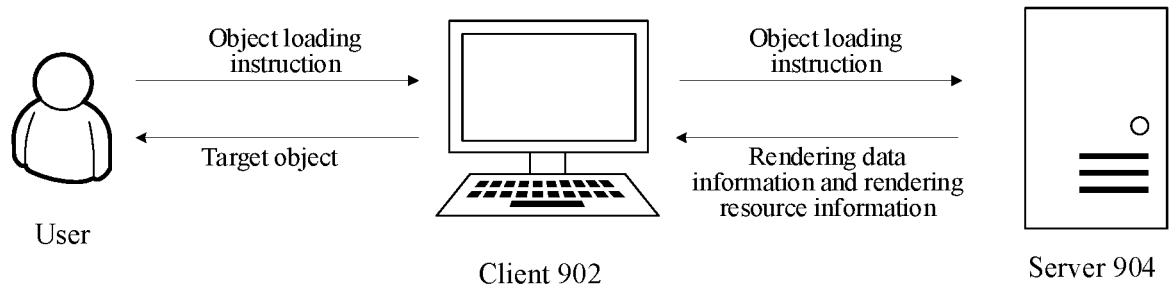
FIG. 9 is a schematic structural diagram of a data processing system according to some embodiments of the present application.

Corresponding to the foregoing method embodiment, the present application further provides some embodiments of a data processing system. FIG. 9 is a schematic structural diagram of a data processing system according to some embodiments of the present application. As shown in FIG. 9, the system includes a client 902 and a server 904, where the client 902 is configured to receive an object loading instruction for a target object, and send the object loading instruction to the server;

the server 904 is configured to receive the object loading instruction for the target object, obtain computing resource information and rendering resource information corresponding to the target object based on the object loading instruction, perform calculation based on the computing resource information to generate rendering data information, and send the rendering data information and the rendering resource information to the client; and the client 902 is configured to receive the rendering data information and the rendering resource information, and draw the target object based on the rendering data information and the rendering resource information.

A data processing system according to the present application includes a client and a server, where the client 902 is configured to receive an object loading instruction for a target object, and send the object loading instruction to the server; the server 904 is configured to receive the object loading instruction for the target object, obtain computing resource information and rendering resource information corresponding to the target object based on the object loading instruction, perform calculation based on the computing resource information to generate rendering data information, and send the rendering data information and the rendering resource information to the client; and the client 902 is configured to receive the rendering data information and the rendering resource information, and draw the target object based on the rendering data information and the rendering resource information. The client only obtains the rendering resource information and the rendering data information, the server obtains the computing resource information and executes a calculation process, and sends the calculated rendering data information to the client, and the client executes a rendering process, so as to separate the calculation process from the rendering process, thereby fundamentally eliminating the possibility that a core resource file of a virtual image is obtained at the client, and ensuring resource security of the virtual image. Resource loading and calculation by the server and resource rendering by the client can increase a loading speed and shorten a time for previewing the virtual image.

The above are the schematic solutions of the data processing apparatus and system of this embodiment. It should be noted that the technical solutions of the data processing apparatus and system are of the same conception as the technical solution of the foregoing data processing method. For details not described in detail in the technical solutions of the data processing apparatus and system, reference may be made to the description of the technical solution of the foregoing data processing method.

Figure 10:
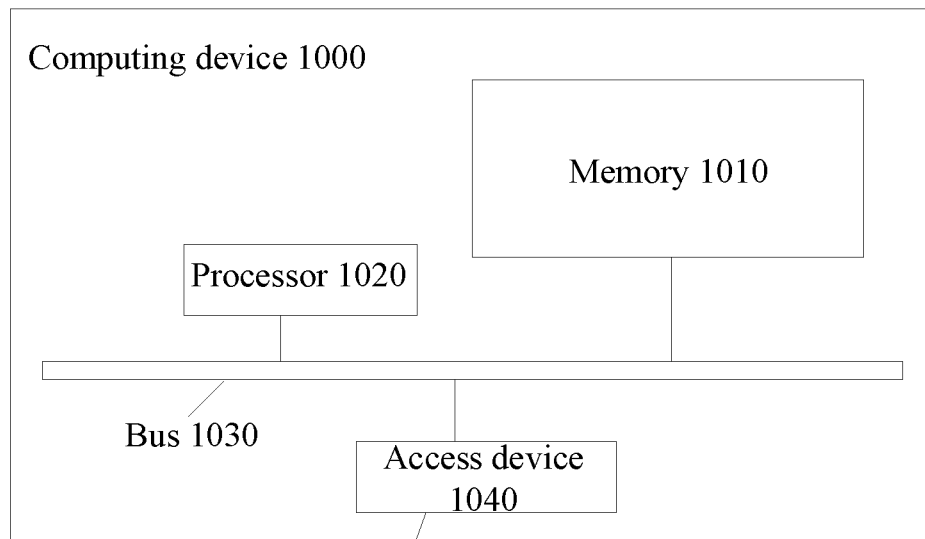
FIG. 10 is a structural block diagram of a computing device according to some embodiments of the present application.
Figure 10:
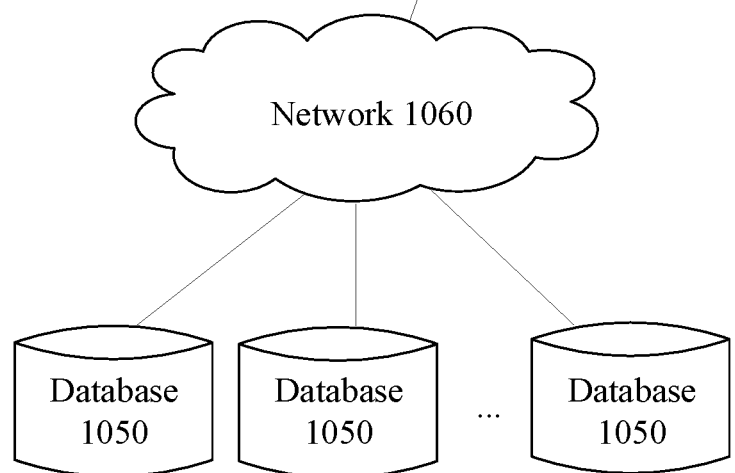

FIG. 10 is a structural block diagram of a computing device 1000 according to some embodiments of the present application. Components of the computing device 1000 include, but are not limited to, a memory 1010 and a processor 1020. The processor 1020 is connected to the memory 1010 by using a bus 1030, and a database 1050 is used to store data.

The computing device 1000 further includes an access device 1040, and the access device 1040 enables the computing device 1000 to communicate by using one or more networks 1060. Examples of these networks include a public switched telephone network (PSTN), a local area network (LAN), a wide area network (WAN), a personal area network (PAN), or a combination of communication networks such as the Internet. The access device 1040 may include one or more of any type of wired or wireless network interfaces (for example, a network interface card (NIC)), such as an IEEE802.11 wireless local area network (WLAN) wireless interface, a worldwide interoperability for microwave access (WiMAX) interface, an Ethernet interface, a universal serial bus (USB) interface, a cellular network interface, a Bluetooth interface, and a near field communication (NFC) interface.

In some embodiments of the present application, the foregoing components of the computing device 1000 and other components not shown in FIG. 10 may be connected to each other, such as by using a bus. It should be understood that the structural block diagram of the computing device shown in FIG. 10 is for the purpose of illustration only, and not for limiting the scope of the present application. A person skilled in the art can add or replace other components as required.

The computing device 1000 may be any type of stationary or mobile computing device, including a mobile device such as a mobile computer or a mobile computing device (for example, a tablet computer, a personal digital assistant, a laptop computer, a notebook computer, and a netbook), a mobile phone (for example, a smart phone), or a wearable computing device (for example, a smartwatch and smart glasses), or a stationary computing device such as a desktop computer or a PC. The computing device 1000 may alternatively be a mobile or stationary server.

When the processor 1020 executes computer instructions, the steps of the data processing method are implemented.

The above is the schematic solution of the computing device of this embodiment. It should be noted that the technical solution of the computing device is of the same conception as the technical solution of the foregoing data processing method. For details not described in detail in the technical solution of the computing device, reference may be made to the description of the technical solution of the foregoing data processing method.

Some embodiments of the present application further provide a computer-readable storage medium, where the computer-readable storage medium stores computer instructions, and when the computer instructions are executed by a processor, the steps of the data processing method described above are implemented.

The above is the schematic solution of the computer-readable storage medium of this embodiment. It should be noted that the technical solution of the storage medium is of the same conception as the technical solution of the foregoing data processing method. For details not described in detail in the technical solution of the storage medium, reference may be made to the description of the technical solution of the foregoing data processing method.

The following describes the specific embodiments of the present application. Other embodiments are within the scope of the appended claims. In some cases, actions or steps described in the claims may be performed in a sequence different from those in the embodiments and desired results may still be achieved. In addition, processes described in the accompanying drawings do not necessarily require a specific order or a sequential order shown to achieve the desired results. In some implementations, multitasking and parallel processing are also possible or may be advantageous.

The computer instructions includes computer program code, and the computer program code may be in a source code form or an object code form, may be an executable file, may be in some intermediate forms, or the like. The computer-readable storage medium may include: any entity or apparatus capable of carrying the computer program code, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, or the like. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunications signal.

It should be noted that, for brief description, the foregoing method embodiments are represented as a combination of a series of actions. However, a person skilled in the art should appreciate that the present application is not limited to the described order of the actions, because according to the present application, some steps may be performed in other orders or simultaneously. In addition, a person skilled in the art should also be aware that the embodiments described in the description are embodiments, and that the actions and modules involved are not necessarily required for the present application.

In the foregoing embodiments, the descriptions of various embodiments have respective focuses. For a part that is not described in detail in some embodiments, reference may be made to related descriptions in other embodiments.

The foregoing disclosed embodiments of the present application are only intended to help describe the present application. The optional embodiments neither describe all the details in detail, nor limit the present invention only to specific implementations. Obviously, many modifications and changes may be made based on the content of the present application. In the present application, these embodiments are selected and specifically described to better explain the principle and practical application of the present application, so that a person skilled in the art can well understand and use the present application. The present application is only limited by the claims and a full scope and equivalents thereof

What is claimed is:

1. A data processing method, comprising:
   receiving an object loading instruction for a target object;
   obtaining computing resource information and rendering resource information corresponding to the target object based on the object loading instruction;
   performing calculation based on the computing resource information to generate rendering data information;
   sending the rendering data information and the rendering resource information to a client; comprising:
   serializing the rendering data information to generate serialized rendering data information;
   compressing the serialized rendering data information to generate the compressed rendering data information, comprising:
   determining whether the serialized rendering data information is first serialized rendering data information;
   in accordance with a determination that the serialized rendering data information is the first serialized rendering data information, compressing the serialized rendering data information to generate the compressed rendering data information; and
   in accordance with a determination that the serialized rendering data information is not the first serialized rendering data information:
   comparing the serialized rendering data information with previous serialized rendering data information to generate serialized rendering difference data information, and
   compressing the serialized rendering difference data information to generate the compressed rendering data information; and
   sending the compressed rendering data information and the rendering resource information to the client.

2. The data processing method according to claim 1, wherein obtaining computing resource information and rendering resource information corresponding to the target object based on the object loading instruction comprises:
   generating a resource acquisition request based on the object loading instruction; and
   obtaining the computing resource information and the rendering resource information corresponding to the target object in response to the resource acquisition request.

3. The data processing method according to claim 2, wherein obtaining the computing resource information and the rendering resource information corresponding to the target object in response to the resource acquisition request comprises:
   determining an identifier of the target object based on the resource acquisition request; and
   searching, from a resource database, the computing resource information and the rendering resource information corresponding to the target object based on the identifier of the target object.

4. The data processing method according to claim 1, wherein performing calculation based on the computing resource information to generate rendering data information comprises:
   generating a resource calculation request based on the object loading instruction; and
   performing calculation based on the computing resource information in response to the resource calculation request, to generate the rendering data information.

5. The data processing method according to claim 4, wherein performing calculation based on the computing resource information in response to the resource calculation request, to generate the rendering data information comprises:
   obtaining model parameter information and static rendering data information in the computing resource information in response to the resource calculation request;
   calculating vertex data information based on the model parameter information; and
   generating the rendering data information based on the vertex data information and the static rendering data information.

6. The data processing method according to claim 1, wherein serializing the rendering data information to generate serialized rendering data information comprises:

compressing the rendering data information to generate initial compressed rendering data information; and serializing the initial compressed rendering data information to generate the serialized rendering data information.

7. The data processing method according to claim 1, further comprising:

receiving an object adjustment request;

generating resource adjustment information based on the object adjustment request;

calculating rendering data information based on the resource adjustment information and the computing resource information; and sending the rendering data information and the rendering resource information to the client.

8. A computer device, comprising:

a processor; and a memory, wherein the memory stores computer instructions executable by the processor, that when executed by the processor, cause the processor to perform the method according to claim 1.

9. A non-transitory computer-readable storage medium storing computer instructions that, when executed by a processor, cause to perform the method according to claim 1.

10. A data processing method, comprising:

receiving an object loading instruction for a target object;

sending the object loading instruction to a server;

receiving rendering data information including compressed rendering data information and rendering resource information returned by the server, wherein the compressed rendering data information comprises serialized rendering data information; and drawing the target object based on the rendering data information and the rendering resource information, comprising:

decompressing the compressed rendering data information to obtain to-be-rendered data information, comprising:

decompressing the compressed rendering data information to obtain the serialized rendering data information;

determining whether the serialized rendering data information is first serialized rendering data information;

in accordance with a determination that the serialized rendering data information is the first serialized rendering data information, deserializing the decompressed rendering data information to obtain the to-be-rendered data information; and in accordance with a determination that the serialized rendering data information is not the first serialized rendering data information:

generating serialized to-be-rendered data information based on the serialized rendering data information and previous serialized rendering data information, and deserializing the serialized to-be-rendered data information to obtain the to-be-rendered data information; and drawing the target object based on the to-be-rendered data information and the rendering resource information.

11. A computer device, comprising:

a processor; and a memory, wherein the memory stores computer instructions executable by the processor, that when executed by the processor, cause the processor to perform the method according to claim 10.

12. A non-transitory computer-readable storage medium storing computer instructions that, when executed by a processor, cause to perform the method according to claim 10.

* * * * *